Andrews & Sproat,
Hanging Saws.
No. 1,457.  Patented Dec. 31, 1839.
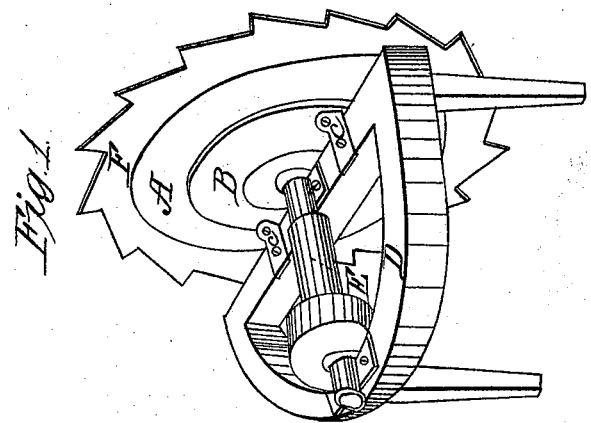
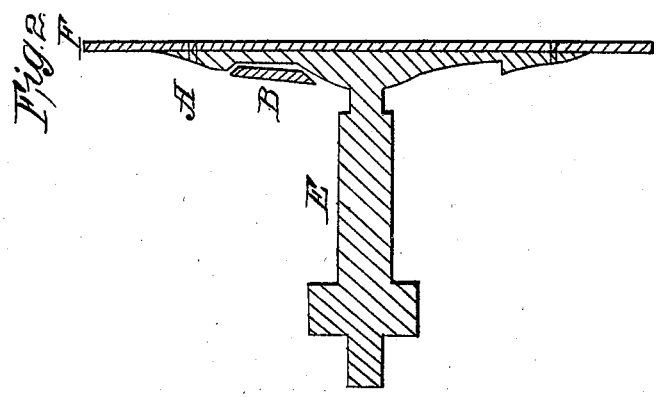

UNITED STATES PATENT OFFICE.

M. ANDREWS AND JAS. SPROAT, OF TAUNTON, MASSACHUSETTS.

MANNER OF RELIEVING THE COLLARS OF CIRCULAR SAWS FROM THE FRICTION OCCASIONED BY THE ARTICLE SAWED.

Specification of Letters Patent No. 1,457, dated December 31, 1839.

*To all whom it may concern:*

Be it known that we, MANASSAH ANDREWS, of Bridgewater, in the county of Plymouth, and JAMES SPROAT, of Taunton, in the county of Bristol, and both in the Commonwealth of Massachusetts, have invented a new and improved mode of relieving the collar of a circular saw used for the purpose of sawing boards, shingles, and other like articles from the friction occasioned by the pressure of the article sawed as it is separated from the block upon the collar of the saw.

The nature of our invention consists of the insertion of a thin semicircular plate of steel or other substance of sufficient strength into the collar of the saw, which collar is countersunk to the distance from the center desired in a circular manner, of sufficient depth to receive the said plate below the surface of the collar; and which plate, being secured at both ends to the frame upon which the saw runs, receives upon its edge, the article sawed, as it is separated from the block, and before it reaches the center or thickest part of the collar, by which means all the friction is saved which would otherwise be occasioned by the pressure of the article sawed upon the collar, while in a state of revolution, and before it passes the center or thickest part of the collar. In short, the plate, being stationary, and thicker than the collar, opens the article sawed from the block, and saves any friction upon the collar or strengthener.

What we claim as our invention, and desire to secure by Letters Patent, is—

The countersink in the collar as before described, and the insertion of the stationary plate or reliever as above described, in such manner as to receive upon its edge the article sawed, as it is separated from the block, and before it reaches the center or thickest part of the collar.

The drawing hereto annexed, correctly represents the construction and working of said improvement.

MANASSAH ANDREWS.
JAS. SPROAT.

Witnesses:
H. G. O. COLBY,
JAMES P. ELLIS.